US009203108B2

(12) United States Patent
Oh et al.

(10) Patent No.: US 9,203,108 B2
(45) Date of Patent: Dec. 1, 2015

(54) ELECTROLYTE FOR RECHARGEABLE LITHIUM BATTERY, AND RECHARGEABLE LITHIUM BATTERY INCLUDING THE SAME

(75) Inventors: Mi-Hyeun Oh, Yongin-si (KR); Ho-Seok Yang, Yongin-si (KR); Dai-In Park, Yongin-si (KR); Jin-Hyunk Lim, Yongin-si (KR)

(73) Assignee: SAMSUNG SDI CO., LTD., Gyeonggi-do (KR)

( * ) Notice: Subject to any disclaimer, the term of this patent is extended or adjusted under 35 U.S.C. 154(b) by 273 days.

(21) Appl. No.: 13/588,801

(22) Filed: Aug. 17, 2012

(65) Prior Publication Data

US 2013/0122378 A1  May 16, 2013

Related U.S. Application Data

(60) Provisional application No. 61/559,627, filed on Nov. 14, 2011.

(51) Int. Cl.
*H01M 10/0567* (2010.01)
*H01M 10/052* (2010.01)
*H01M 4/133* (2010.01)
*H01M 4/134* (2010.01)
*H01M 4/38* (2006.01)
(Continued)

(52) U.S. Cl.
CPC ............ *H01M 10/052* (2013.01); *H01M 4/133* (2013.01); *H01M 4/134* (2013.01); *H01M 4/386* (2013.01); *H01M 4/387* (2013.01); *H01M 4/485* (2013.01); *H01M 10/0525* (2013.01); *H01M 10/0567* (2013.01); *H01M 10/0569* (2013.01); *H01M 2300/0028* (2013.01); *Y02E 60/122* (2013.01)

(58) Field of Classification Search
CPC .................................................. H01M 10/0567
USPC .................. 429/332, 334, 343, 338, 326, 303
See application file for complete search history.

(56) References Cited

U.S. PATENT DOCUMENTS 7,781,106 B2   8/2010   Abe et al.
2001/0019800 A1*  9/2001   Herreyre et al. .............. 429/332
(Continued)

FOREIGN PATENT DOCUMENTS

EP      2 498 329 A1    9/2012
JP      2007-141831 A   6/2007
(Continued)

OTHER PUBLICATIONS

Extended European Search Report dated Feb. 21, 2013 for European Patent Application No. EP 12 182 326.4 which claims priority from U.S. Appl. No. 61/559,627, filed Nov. 14, 2011, and captioned U.S. Appl. No. 13/588,801.

(Continued)

*Primary Examiner* — Patrick Ryan
*Assistant Examiner* — Alex Usyatinsky
(74) *Attorney, Agent, or Firm* — Knobbe Martens Olson & Bear LLP (57) ABSTRACT

An electrolyte solution for a rechargeable lithium battery that includes a lithium salt; a non-aqueous organic solvent including ethyl acetate; and an additive including a sultone-based compound, wherein the sultone-based compound is included in an amount ranging from 0.1 to 5 wt % based on the total amount of the electrolyte solution is provided.

15 Claims, 2 Drawing Sheets

(51) Int. Cl.
   *H01M 4/485* (2010.01)
   *H01M 10/0525* (2010.01)
   *H01M 10/0569* (2010.01)

(56) References Cited

U.S. PATENT DOCUMENTS

| | | | |
|---|---|---|---|
| 2004/0137327 A1* | 7/2004 | Gross et al. | 429/231.8 |
| 2006/0124973 A1* | 6/2006 | Arai et al. | 257/223 |
| 2008/0038645 A1 | 2/2008 | Kolosnitsyn et al. | |
| 2010/0015514 A1 | 1/2010 | Miyagi et al. | |
| 2010/0248039 A1 | 9/2010 | Oh et al. | |
| 2010/0261068 A1* | 10/2010 | Jeon et al. | 429/326 |

FOREIGN PATENT DOCUMENTS

| | | | |
|---|---|---|---|
| JP | 2010-500709 A | 1/2010 | |
| KR | 10-1999-0088654 A | 12/1999 | |
| KR | 10-2010-0109180 A | 10/2010 | |
| KR | 10-2011-0079773 A | 7/2011 | |
| WO | WO 2008/153347 | * 12/2008 | H01M 10/40 |

OTHER PUBLICATIONS

European Examination Report dated Dec. 17, 2013 for European Patent Application No. EP 12 182 326.4 which claims priority from U.S. Appl. No. 61/559,627, filed Nov. 14, 2011, and captioned U.S. Appl. No. 13/588,801.

* cited by examiner

ELECTROLYTE FOR RECHARGEABLE LITHIUM BATTERY, AND RECHARGEABLE LITHIUM BATTERY INCLUDING THE SAME

CROSS-REFERENCE TO RELATED APPLICATION

This application claims priority under 35 U.S.C. §119(e) to U.S. Provisional Application No. 61/559,627 filed Nov. 14, 2011, the disclosure of which is incorporated in its entirety herein by reference.

BACKGROUND

1. Field

This disclosure relates to an electrolyte solution for a rechargeable lithium battery and a rechargeable lithium battery including the same.

2. Description of the Related Technology

A lithium rechargeable battery using an organic electrolyte solution has twice the discharge voltage of a conventional battery using an alkali aqueous solution and as a result, has high energy density.

Such a rechargeable lithium battery includes a positive electrode including a positive active material being capable of intercalating or deintercalating lithium and a negative electrode including a negative active material being capable of intercalating or deintercalating lithium, and an electrolyte solution.

Applying a high voltage to a rechargeable lithium battery can cause a sharply deteriorated a life-cycle. Particularly, applying a high voltage to a rechargeable lithium battery with increased resistance at a low temperature can seriously deteriorate the life-cycle of the battery. A rechargeable lithium battery using a negative electrode including Si has been researched in order to improve low temperature characteristics and capacity of a rechargeable lithium battery, but the battery has a problem of a side reaction between Si and a conventional organic solvent.

SUMMARY

Some embodiments provide a rechargeable lithium battery improving capacity as well as low temperature life-cycle characteristics by using Si as a negative active material and minimizing a side reaction between Si and an electrolyte solution and thus, improving high temperature life-cycle characteristics.

Some embodiments provide an electrolyte for a rechargeable lithium battery, comprising:
a first additive component, wherein the first additive component includes a compound of Chemical Formula 3:

[Chemical Formula 3]

wherein, in Chemical Formula 3,
L may be $(L^1)_m$;
each $L^1$ may be independently selected where $L^1$ may be selected from the group consisting of $C(R^9)_2$ and $(CR^{10}=CR^{10})$;

each $R^9$ may be independently selected, where $R^9$ may be hydrogen (H), an unsubstituted or substituted $C_{1-6}$ alkyl group, or an unsubstituted or substituted aryl group;
each $R^{10}$ may be independently selected, where $R^{10}$ may be hydrogen (H), an unsubstituted or substituted $C_{1-6}$ alkyl group, or an unsubstituted or substituted aryl group;
m may be 1, 2, 3, 4, 5, 6, 7, 8, 9 or 10;
a lithium salt; and
a first organic solvent component, wherein the first organic solvent may include a compound of Chemical Formula 4:

[Chemical Formula 4]

wherein, in Chemical Formula 4,
$R^{11}$ may be unsubstituted or substituted $C_{1-6}$ alkyl; and
$R^{12}$ may be unsubstituted or substituted $C_{1-6}$ alkyl group, or an unsubstituted or substituted aryl group, wherein the electrolyte may include greater than 0.01% to less than 6% by weight of the first additive component based on the total weight of the electrolyte. In certain embodiments, the electrolyte may include from about 10% to about 60% by volume of the first organic solvent component based on the total volume of the electrolyte. In certain embodiments, the electrolyte may further comprise a second organic solvent component, wherein the second organic solvent component may include one or more compounds including a carbonate moiety. In certain embodiments, the second organic solvent component may include one or more compounds selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), and butylene carbonate (BC). In certain embodiments, the second organic solvent component may include one or more compounds selected from the group consisting of dimethyl carbonate (DMC), ethylmethyl carbonate (EMC), and ethylene carbonate (EC). In certain embodiments, the first organic solvent component may be methyl acetate, ethyl acetate or propyl acetate. In certain embodiments, the first organic solvent component may be ethyl acetate. In certain embodiments, the electrolyte may include from about 0.1% to about 5% by weight of the first additive component based on the total weight of the electrolyte. In certain embodiments, the first additive component may include 1,3-propane sultone, 1,3-propene sultone, 1,4-butane sultone, or mixtures thereof. In certain embodiments, the first additive component may be 1,3-propane sultone. In certain embodiments, the first additive component may be 1,3-propene sultone. In certain embodiments, the first additive component may be 1,4-butane sultone. In certain embodiments, the lithium salt may comprise $LiPF_6$, $LiBF_4$, $LiSbF_6$, $LiAsF_6$, $LiN(SO_2C_2F_5)_2$, $LiN(SO_2CF_3)_2$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiCl, LiI, $LiB(C_2O_4)_2$ (lithium bis(oxalato) borate), or one or more combinations thereof. In certain embodiments, the first additive component may be 1,3-propane sultone or 1,3-propene sultone, the lithium salt may be $LiPF_6$, the first organic solvent component may be methyl acetate, ethyl acetate or propyl acetate, and the second organic solvent component may be dimethyl carbonate (DMC), ethylene carbonate (EC), or mixtures thereof. In certain embodiments, the ratio of first organic solvent component to second organic solvent component may be in a range of from about 1:50 to about 50:1, from about 1:10 to about 10:1, or from about 1:9 to about 3:2. In certain embodiments, the ratio of first organic solvent component to second organic solvent component may be in a range of from about 1:50 to about 50:1. In certain embodiments, the ratio of first organic solvent component to second organic solvent component may be in a range of from about 1:10 to about 10:1. In certain embodiments, the ratio of first organic solvent component to second organic solvent component may be in a range of from about 1:9 to about 3:2.

Some embodiments provide a rechargeable lithium battery comprising:
a negative electrode including a negative active material, a positive electrode including a positive active material, and, an electrolyte as disclosed and described herein. In certain embodiments, the battery further comprises a separator interposed between the negative electrode and the positive electrode. In certain embodiments, the negative active material may include one or more components selected from the group consisting of a carbon material, a Si-based compound, a Sn-based compound, a lithium metal, a lithium metal alloy, and a transition metal oxide. In certain embodiments, the negative active material may include one or more components selected from the group consisting of a carbon material, and a Si-based compound. In certain embodiments, the negative active material may include a carbon material, wherein the carbon material is graphite. In certain embodiments, the negative active material further comprises a Si-based compound, wherein the Si-based compound may be selected from the group consisting of Si, $SiO_x$, a Si-carbon composite, a Si-Q alloy, and combinations thereof, wherein, ($0<x<2$), and Q may be selected from the group consisting of an alkali metal, an alkaline-earth metal, elements selected from Group 13 to 16, a transition element, a rare earth element, and a combination thereof, where Q is not Si. In certain embodiments, the ratio of the weight of the Si-based compound to the weight of graphite ranges from about 1:99 to 10:90. In certain embodiments, the ratio of the weight of the Si-based compound to the weight of the graphite ranges from about 2:98 to about 6:94. In certain embodiments, the first additive component may be 1,3-propane sultone. In certain embodiments, the first additive component may be 1,3-propene sultone. In certain embodiments, the first organic solvent component may be methyl acetate. In certain embodiments, the first organic solvent component may be ethyl acetate. In certain embodiments, the first organic solvent component may be propyl acetate. In certain embodiments, the first additive component may include 1,3-propane sultone, 1,3-propene sultone, or mixtures thereof; and the first organic solvent component may include methyl acetate, ethyl acetate, or propyl acetate. In certain embodiments, the first additive component may include 1,3-propane sultone, and the first organic solvent component may include ethyl acetate. In certain embodiments, the lithium salt comprises $LiPF_6$, the first organic solvent component may be ethyl acetate, and the negative active material may include a Si-based compound and graphite.

One embodiment provides an electrolyte solution for a rechargeable lithium battery having excellent life-cycle characteristics at a high voltage and a low temperature.

Another embodiment provides an electrolyte solution for a rechargeable lithium battery that improves high temperature life-cycle characteristics by minimizing a side reaction between a Si-based compound and an organic solvent. In certain embodiments, the organic solvent may be an anhydrous organic solvent.

Yet another embodiment provides a rechargeable lithium battery including the electrolyte solution.

One embodiment provides an electrolyte solution for a rechargeable lithium battery that includes a lithium salt; an organic solvent including methyl acetate, ethyl acetate, or propyl acetate; and an additive including a sultone-based compound, wherein the sultone-based compound is included in an amount of 0.1 to 5 wt % based on the total weight of the electrolyte solution. In certain embodiments, the organic solvent may include ethyl acetate.

In certain embodiments, the methyl acetate, ethyl acetate, or propyl acetate may be included in an amount of 10 to 60 volume % based on the total amount of the organic solvent.

In certain embodiments, the sultone-based compound may be C1 to C10 alkane sultone or C1 to C10 alkene sultone.

In certain embodiments, the C1 to C10 alkane sultone or C1 to C10 alkene sultone may be selected from the group consisting of 1,3-propane sultone, 1,3-propene sultone, and combinations thereof.

In certain embodiments, the organic solvent may be selected from ethyl carbonate (EC), ethylmethyl carbonate (EMC), dimethyl carbonate (DMC), diethyl carbonate (DEC), propyl carbonate (PC), and a combination thereof. In certain embodiments, the organic solvent including methyl acetate, ethyl acetate, or propyl acetate may further include ethyl carbonate (EC), ethylmethyl carbonate (EMC), dimethyl carbonate (DMC), diethyl carbonate (DEC), propyl carbonate (PC), and combinations thereof. In certain embodiments, the organic solvent may include ethyl acetate and may further include ethyl carbonate (EC), ethylmethyl carbonate (EMC), dimethyl carbonate (DMC), diethyl carbonate (DEC), propyl carbonate (PC), and combinations thereof.

In certain embodiments, the organic solvent may include ethyl carbonate (EC) and dimethyl carbonate (DMC) in a volume ratio of 1:1 to 1:3.

Some embodiments provides a rechargeable lithium battery that includes a negative electrode including a negative active material, a positive electrode including a positive active material, a separator interposed between the negative electrode and the positive electrode, and an electrolyte solution, wherein the electrolyte solution includes a lithium salt; an organic solvent including methyl acetate, ethyl acetate, or propyl acetate; and a sultone-based compound that may be included in an amount of 0.1 to 5 wt % based on the total amount of the electrolyte solution.

In certain embodiments, the negative active material may be selected from a carbon material, a Si-based compound, a Sn-based compound, a lithium metal, a lithium metal alloy, a transition metal oxide, and combinations thereof.

In certain embodiments, the Si-based compound may be selected from Si, $SiO_x$, ($0<x<2$), a Si-carbon composite, a Si-Q alloy (wherein Q is selected from an alkali metal, an alkaline-earth metal, elements selected from Group 13 to 16, a transition element, a rare earth element, and a combination thereof, but not Si), and combinations thereof.

In certain embodiments, the negative active material may include a Si-based compound and a carbon material.

In addition, the negative active material may include a Si-based compound and a carbon material in a weight ratio ranging from 1:99 to 10:90.

In certain embodiments, the methyl acetate, ethyl acetate, or propyl acetate in the electrolyte solution may be included in an amount of 10 to 60 volume % based on the total amount of the organic solvent.

In certain embodiments, the sultone-based compound may be C1 to C10 alkane sultone or C1 to C10 alkene sultone.

In certain embodiments, the C1 to C10 alkane sultone or C1 to C10 alkene sultone may be one selected from 1,3-propane sultone, 1,3-propene sultone, and combinations thereof.

In certain embodiments, the organic solvent may be one selected from ethyl carbonate (EC), ethylmethyl carbonate (EMC), dimethyl carbonate (DMC), diethyl carbonate (DEC), propyl carbonate (PC), and a combination thereof.

In certain embodiments, the organic solvent may include ethyl carbonate (EC) and dimethyl carbonate (DMC) in a volume ratio of 1:1 to 1:3.

In certain embodiments, the electrolyte solution for a rechargeable lithium battery may provide a rechargeable lithium battery having excellent life-cycle characteristics at a high voltage at a low and/or high temperature.

DESCRIPTION OF SYMBOLS

100: rechargeable lithium battery
112: negative electrode
113: separator
114: positive electrode
120: battery case
140: sealing member

DETAILED DESCRIPTION

Exemplary embodiments will hereinafter be described in detail. However, these embodiments are exemplary, and this disclosure is not limited thereto.

Some embodiments provide an electrolyte solution for a rechargeable lithium battery including a lithium salt; an organic solvent; and a first additive component, wherein the first additive component is included in an amount of 0.1 to 5 wt % based on the total weight of the electrolyte solution.

In certain embodiments, the first additive component may include a compound of Chemical Formula 3:

Chemical Formula 3 wherein, in Chemical Formula 3,
L may be $(L^1)_m$;
each $L^1$ may be independently selected where $L^1$ may be selected from the group consisting of $C(R^9)_2$ and $(CR^{10}=CR^{10})$;
each $R^9$ may be independently selected, where $R^9$ may be hydrogen (H), an unsubstituted or substituted $C_{1-6}$ alkyl group, or an unsubstituted or substituted aryl group;
each $R^{10}$ may be independently selected, where $R^{10}$ may be hydrogen (H), an unsubstituted or substituted $C_{1-6}$ alkyl group, or an unsubstituted or substituted aryl group; and
m may be 1, 2, 3, 4, 5, 6, 7, 8, 9 or 10. In certain embodiments, m may be 1, 2, or 3. In certain embodiments, m may be 3, each $L^1$ may be $C(R^9)_2$, and each $R^9$ may be may be hydrogen (H). In certain embodiments, m may be 2, one $L^1$ may be $C(R^9)_2$, and the other $L^1$ may be $(CR^{10}=CR^{10})$, each $R^9$ may be may be hydrogen (H), and each $R^{10}$ may be may be hydrogen (H).

In certain embodiments, the first organic solvent includes a compound of Chemical Formula 4:

Chemical Formula 4 wherein, in Chemical Formula 4,
$R^{11}$ may be unsubstituted or substituted $C_{1-6}$ alkyl; and
$R^{12}$ may be unsubstituted or substituted $C_{1-6}$ alkyl group, or an unsubstituted or substituted aryl group. In certain embodiments, $R^{11}$ may be unsubstituted $C_{1-3}$ alkyl; and $R^{12}$ may be unsubstituted $C_{1-3}$ alkyl group. In certain embodiments, $R^{11}$ may be methy, ethyl or propyl; and $R^{12}$ may be methyl. In certain embodiments, the compound of Chemical Formula 4 may be selected from the group consisting of methyl acetate, ethyl acetate, and propyl acetate.

In certain embodiments, the lithium salt can include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, LiB $C_2O_{42}$, LiBOB (lithium bis(oxalato) borate), LiTFSI (lithium bis(trifluoromethanesulfonyl)imide, or mixtures thereof. In certain embodiments, the lithium salt may be used in a concentration of 0.1 to 2.0M. In certain embodiments, the electrolyte solution may realize electrolyte performance due to optimal conductivity and viscosity and lithium ion may be effectively transported when the lithium salt is included in a concentration of 0.1 to 2.0M. In certain embodiments, the lithium salt may be $LiPF_6$.

In certain embodiments, the organic solvent of the electrolyte solution for a rechargeable lithium battery includes methyl acetate, ethyl acetate, or propyl acetate.

In certain embodiments, the methyl acetate, ethyl acetate, or propyl acetate may be included in an amount ranging from 10 to 60 volume % and for example, from 20 to 40 volume % based on the total amount of the organic solvent. In certain embodiments, an electrolyte solution may increase discharge capacity of a rechargeable battery by about 40 to 70% compared with an electrolyte solution including no methyl acetate, ethyl acetate, or propyl acetate when the organic solvent includes methyl acetate, ethyl acetate, or propyl acetate in an amount ranging from 10 to 60 volume %, and thus improve life-cycle and cycle characteristics of the rechargeable battery.

In certain embodiments, the organic solvent may further include a carbonate-based, ester-based, ether-based, ketone-based, alcohol-based, or aprotic solvent. In certain embodiments, the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include methylpropionate, ethylpropionate, γ-butyrolactone, decanolide, valerolactone, mevalonolactone, caprolactone, and the like. In certain embodiments, the ether-based solvent may include dibutyl ether, tetraglyme, diglyme, dimethoxyethane, 2-methyltetrahydrofuran, tetrahydrofuran, and the like, and the ketone-based solvent may include cyclohexanone, and the like. In certain embodiments, the alcohol-based solvent may include ethanol, isopropyl alcohol, and the like. In certain embodiments, the aprotic solvent include nitriles such as R—CN (R is a C1 to C20 linear, branched or cyclic hydrocarbon group including a double bond, an aromatic ring or an ether bond), amides such as dimethyl formamide, and the like, dioxolanes such as 1,3-dioxolane, and the like, sulfolanes, and the like.

In certain embodiments, a mixing ratio of the components in the organic solvent may be controlled to achieve certain performance characteristics of a battery.

In certain embodiments, the organic solvent may include ethyl carbonate (EC) and dimethyl carbonate (DMC) in a volume ratio of 1:1 to 1:3.

In certain embodiments, the carbonate-based solvent may include a mixture of a cyclic carbonate and a linear carbonate. The cyclic carbonate and the linear carbonate may be mixed together in a volume ratio of about 1:1 to about 1:9 as an electrolyte, the electrolyte may have enhanced performance.

In certain embodiments, the electrolyte may be prepared by further adding the aromatic hydrocarbon-based solvent to the carbonate-based solvent. In certain embodiments, the carbonate-based solvent and the aromatic hydrocarbon-based solvent are mixed together in a volume ratio of about 1:1 to about 30:1.

In certain embodiments, the aromatic hydrocarbon-based organic solvent may be an aromatic hydrocarbon-based compound represented by the following Chemical Formula 1.

Chemical Formula 1

In Chemical Formula 1, $R_1$ to $R_6$ may be each independently hydrogen, halogen, a C1 to C10 alkyl group, a $C_1$ to C10 haloalkyl group, or a combination thereof.

In certain embodiments, the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In certain embodiments, the electrolyte solution for a rechargeable lithium battery may include an additive of a sultone-based compound, wherein the sultone-based compound may be included in an amount of 0.1 to 5 wt % based on the total amount of the electrolyte solution.

In certain embodiments, the sultone-based compound may include C1 to C10 alkane sultone, C1 to C10 alkene sultone, and the like, and examples thereof include one selected from 1,3-propane sultone, 1,3-propene sultone, and combinations thereof.

In certain embodiments, the sultone-based compound may be included in an amount of 0.1 to 5 wt %, preferably 1 to 3 wt % based on the total amount of the electrolyte solution. In certain embodiments, a rechargeable lithium battery may have improved low temperature and high temperature life-cycle characteristics when the sultone-based compound is included in an amount of 0.1 to 5 wt %.

In certain embodiments, an electrolyte solution including ethyl acetate and a sultone-based compound as an additive, may solve high temperature life-cycle characteristic deterioration of a conventional negative active material including a Si-based compound. In certain embodiments, an electrolyte solution including a sultone-based compound may improve high temperature life-cycle characteristics of a negative active material including a Si-based compound by forming a layer on the interface of a negative electrode during the charge and discharge of a battery, which may suppress reaction between the Si-based compound and the electrolyte solution, and prevent destruction of the Si-based compound where lithium intercalates/deintercalates.

In certain embodiments, an electrolyte solution including ethyl acetate and a sultone-based compound wherein the sultone-based compound may be included in an amount of 0.1 to 5 wt % based on the total amount of the electrolyte solution may suppress reaction between a Si-based compound and an electrolyte solution improving high temperature life-cycle characteristics.

In certain embodiments, the electrolyte solution for a rechargeable lithium battery may further include vinylene carbonate or an ethylene carbonate-based compound represented by the following Chemical Formula 2 as an additive to improve battery life-cycle.

Chemical Formula 2

In Chemical Formula 2, $R_7$ and $R_8$ may be each independently hydrogen, a halogen, a cyano group (CN), a nitro group ($NO_2$), or a C1 to C5 fluoroalkyl group, provided that at least one of $R_7$ and $R_8$ is a halogen, a cyano group (CN), a nitro group ($NO_2$), or a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

Some embodiments provide a rechargeable lithium battery including a non-aqueous electrolyte.

A rechargeable lithium battery may be classified as a lithium ion battery, a lithium ion polymer battery, and a lithium polymer battery according to the presence of a separator and the kind of an electrolyte used therein. In certain embodiments, the rechargeable lithium battery may have a variety of shapes and sizes and thus, may include a cylindrical, prismatic, coin, or pouch-type battery and a thin film type or a bulky type in size.

Figure 1:
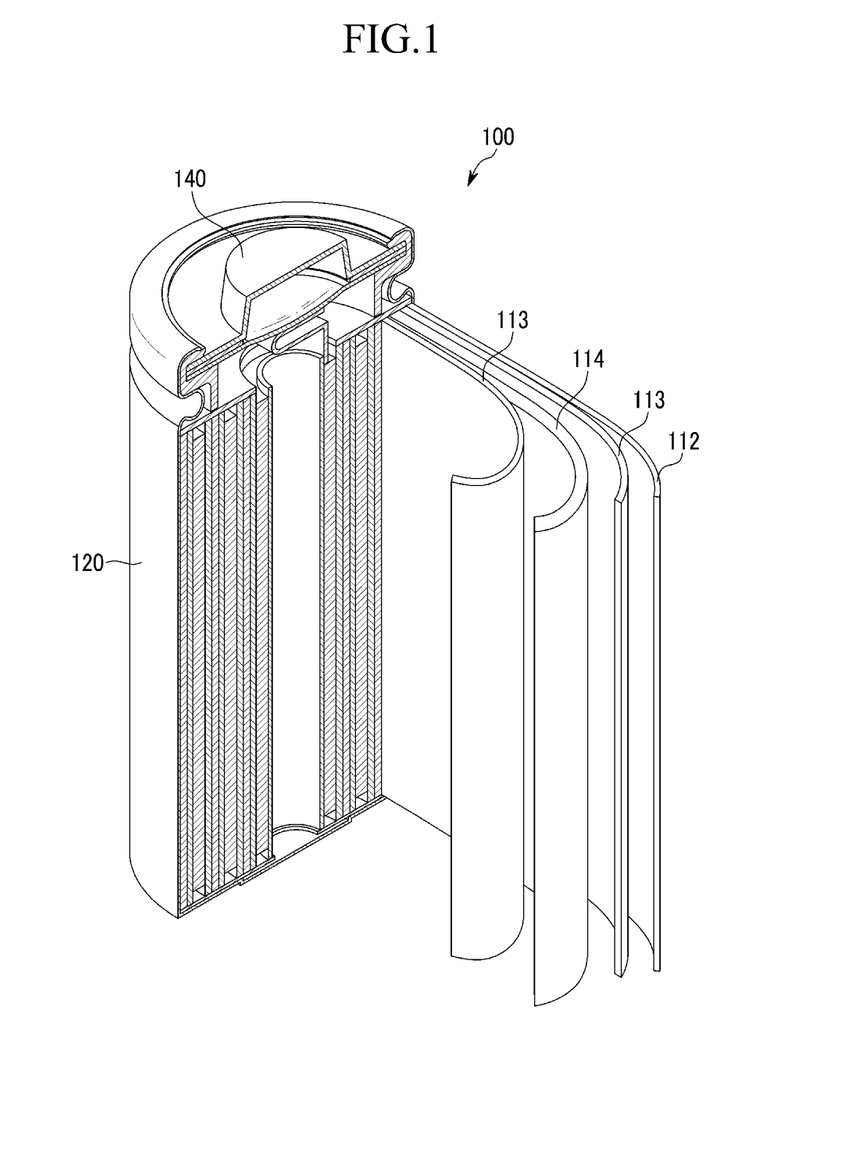
FIG. 1 is a schematic view of a rechargeable lithium battery according to one embodiment.

FIG. 1 is an exploded perspective view showing the schematic structure of a rechargeable lithium battery. Referring to FIG. 1, the rechargeable lithium battery 100 includes a negative electrode 112, a positive electrode 114, a separator 113 interposed between the negative electrode 112 and the positive electrode 114, an electrolyte (not shown) impregnating the negative electrode 112, positive electrode 114, and separator 113, a battery case 120, and a sealing member 140 sealing the battery case 120. In certain embodiments, the rechargeable lithium battery 100 may be fabricated by sequentially laminating a negative electrode 112, a positive electrode 114, and a separator 113, spirally winding them, and housing the spiral-wound product in a battery case 120.

In certain embodiments, the negative electrode 112 includes a current collector and a negative active material layer disposed on the current collector. In certain embodiments, the negative active material layer may include a negative active material.

In certain embodiments, the negative active material may be selected from a carbon material, a Si-based compound, a Sn-based compound, a lithium metal, a lithium metal alloy, a transition metal oxide, and a combination thereof.

In certain embodiments, the carbon material may be any carbon-based negative active material generally used in a lithium ion rechargeable battery. Examples of the carbon material may be selected from crystalline carbon, amorphous carbon, and mixtures thereof. In certain embodiments, the crystalline carbon may be non-shaped, or sheet, flake, spherical, or fiber-shaped natural graphite or artificial graphite. In certain embodiments, the amorphous carbon may be a soft carbon (carbon fired at low temperature), a hard carbon, a mesophase pitch carbonized product, fired coke, and the like.

In certain embodiments, the Si-based compound may be Si, $SiO_x$, ($0<x<2$), a Si—C composite, or a Si-Q alloy (wherein Q is an alkali metal, an alkaline-earth metal, elements selected from group 13 to 16, a transition element, a rare earth element, or a combination thereof, but not Si). In certain embodiments, the Si-based compound may be included in an amount of 1 to 10 wt % based on the total amount of the negative active material. In certain embodiments, the Si-based compound may have a high discharge capacity compared with a carbon material such as graphite and the like. In addition, an electrolyte solution including methyl acetate, ethyl acetate, or propyl acetate, and a sultone-based compound in an amount ranging from 0.1 wt % to 5 wt % with, a negative active material including the Si-based compound may bring about a high discharge capacity and excellent high temperature life-cycle characteristics.

In certain embodiments, variable Q of the Si-Q alloy may include one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

In certain embodiments, the Si-based compound may be used along with the carbon material of artificial graphite, natural graphite, and the like. In certain embodiments, the Si-based compound and a carbon material may be mixed in a weight ratio ranging from 1:99 to 10:90. A negative active material may realize a good room temperature life-cycle and simultaneously improve high temperature life-cycle that includes the Si-based compound and the carbon material mixed in a weight ratio ranging from 1:99 to 10:90.

In certain embodiments, the Sn-based compound may include Sn, $SnO_2$, a Sn—R alloy (wherein R is an alkali metal, an alkaline-earth metal, elements selected group 13 to 16, a transition element, a rare earth element, or a combination thereof, but not Sn). In certain embodiments, at least one of the Si-based compound and Sn-based compound may be mixed with $SiO_2$.

In certain embodiments, variable R of the Sn—R alloy may include one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

In certain embodiments, the lithium metal alloy may include lithium and a metal selected from Na, K, Rb, Cs, Fr, Be, Mg, Ca, Sr, Si, Sb, Pb, In, Zn, Ba, Ra, Ge, Al or Sn.

In certain embodiments, the transition metal oxide may include vanadium oxide, lithium vanadium oxide, and the like.

In certain embodiments, the negative active material layer may include a binder and optionally, a conductive material.

In certain embodiments, the binder improves binding properties of negative active material particles with one another and with a current collector. Examples of the binder include at least one selected from polyvinyl alcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but is not limited thereto.

In certain embodiments, the conductive material improves electrical conductivity of a negative electrode. Any electrically conductive material can be used as a conductive agent, unless it causes a chemical change. Examples of the conductive material include, but are limited to, at least one component selected from the group consisting of a carbon-based material such as natural graphite, artificial graphite, carbon black, acetylene black, ketjen black, carbon fiber, and the like; a metal-based material of a metal powder or a metal fiber including copper, nickel, aluminum, silver or the like; a conductive polymer such as a polyphenylene derivative, and the like; and mixtures thereof.

In certain embodiments, the current collector includes a copper foil, a nickel foil, a stainless steel foil, a titanium foil, a nickel foam, a copper foam, a polymer substrate coated with a conductive metal, or combinations thereof.

In certain embodiments, the positive electrode 114 may include a current collector and a positive active material layer formed on the current collector.

In certain embodiments, the positive active material may include a compound (a lithiated intercalation compound) reversibly intercalating and deintercalating lithium. Examples of the positive active material may include, but are not limited to, at least one composite oxide of a metal such as cobalt, manganese, nickel, or a combination thereof with lithium and in particular, one of the compound represented by the following Chemical Formulas: $Li_aA_{1-b}R_bD_2$ (wherein, in the preceding Chemical Formula, $0.90 \leq a \leq 1.8$ and $0 \leq b \leq 0.5$); $Li_aE_{1-b}R_bO_{2-c}D_c$ (wherein, in the preceding Chemical Formula, $0.90 \leq a \leq 1.8$, $0 \leq b \leq 0.5$ and $0 \leq c \leq 0.05$); $LiE_{2-b}R_bO_{4-c}D_c$ (wherein, in the preceding Chemical Formula, $0 \leq b \leq 0.5$, $0 \leq c \leq 0.05$); $Li_aNi_{1-b-c}Co_bR_eD_\alpha$ (wherein, in the preceding Chemical Formula, $0.90 \leq a \leq 1.8$, $0 \leq b \leq 0.5$, $0 \leq c \leq 0.05$ and $0 < \alpha \leq 2$); $Li_aNi_{1-b-c}Co_bR_eO_{2-\alpha}Z_\alpha$ (wherein, in the preceding Chemical Formula, $0.90 \leq a \leq 1.8$, $0 \leq b \leq 0.5$, $0 \leq c \leq 0.05$ and $0 \leq \alpha \leq 2$); $Li_aNi_{1-b-c}Co_bR_cO_{2-\alpha}Z_2$ (wherein, in the preceding Chemical Formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ (wherein, in the preceding Chemical Formula, $0.90 \leq a \leq 1.8$, $0 \leq b \leq 0.5$, $0 \leq c \leq 0.05$ and $0 < \alpha \leq 2$); $Li_aNi_{1-b-c}Mn_bR_eO_{2-\alpha}Z_\alpha$ (wherein, in the preceding Chemical Formula, $0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ (wherein, in the preceding Chemical Formula, $0.90 \leq a \leq 1.8$, $0 \leq b \leq 0.5$, $0 \leq c \leq 0.05$ and $0 < \alpha < 2$); $Li_aNi_bE_cG_dO_2$ (wherein, in the preceding Chemical Formula, $0.90 \leq a \leq 1.8$, $0 \leq b \leq 0.9$, $0 \leq c \leq 0.5$ and $0.001 \leq d \leq 0.1$.); $Li_aNi_bCo_cMn_dG_eO_2$ (wherein, in the preceding Chemical Formula, $0.90 \leq a \leq 1.8$, $0 \leq b \leq 0.9$, $0 \leq c \leq 0.5$, $0 \leq d \leq 0.5$ and $0.001 \leq e \leq 0.1$.); $Li_aNiG_bO_2$ (wherein, in the preceding Chemical Formula, $0.90 \leq a \leq 1.8$ and $0.001 \leq b \leq 0.1$.); $Li_aCoG_bO_2$ (wherein, in the preceding Chemical Formula, $0.90 \leq a \leq 1.8$ and $0.001 \leq b \leq 0.1$.); $Li_aMnG_bO_2$ (wherein, in the preceding Chemical Formula, $0.90 \leq a \leq 1.8$ and $0.001 \leq b \leq 0.1$.); $Li_aMn_2G_bO_4$ (wherein, in the preceding Chemical Formula, $0.90 \leq a \leq 1.8$ and $0.001 \leq b \leq 0.1$.); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In Chemical Formulas, A may be selected from Ni, Co, Mn, and a combination thereof; R may be selected from Al, Ni, Co, Mn, Cr, Fe, Mg, Sr, V, a rare earth element, and a combination thereof; D may be selected from O, F, S, P, and a combination thereof; E may be selected from Co, Mn, and a combination thereof; Z may be selected from F, S, P, and a combination thereof; G may be selected from Al, Cr, Mn, Fe, Mg, La, Ce, Sr, V, and a combination thereof; Q may be selected from Ti, Mo, Mn, and a combination thereof; T may be selected from Cr, V, Fe, Sc, Y, and a combination thereof; and J may be selected from V, Cr, Mn, Co, Ni, Cu, and a combination thereof.

In certain embodiments, the positive active material may include the positive active material with the coating layer, or a compound of the active material and the active material coated with the coating layer. In certain embodiments, the coating layer may include at least one coating element compound selected from the group consisting of an oxide and a hydroxide of the coating element, an oxyhydroxide of the coating element, an oxycarbonate of the coating element, and a hydroxycarbonate of the coating element. In certain embodiments, the compound for the coating layer may be either amorphous or crystalline. In certain embodiments, the coating element included in the coating layer may be one selected from Mg, Al, Co, K, Na, Ca, Si, Ti, V, Sn, Ge, Ga, B, As, Zr, and a combination thereof. In certain embodiments, the coating process may include any conventional processes as long as it does not cause any side effects on the properties of the positive active material (e.g., spray coating, immersing).

In certain embodiments, the positive active material layer may also include a binder and a conductive material.

In certain embodiments, the binder may improve binding properties of the positive active material particles to each other and to a current collector. Examples of the binder include, but are not limited to, at least one selected from polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, epoxy a resin, nylon, and the like.

In certain embodiments, the conductive material may improve electrical conductivity of a negative electrode. Any electrically conductive material can be used as a conductive agent unless it causes a chemical change. Examples of the conductive material include, but are not limited to, natural graphite, artificial graphite, carbon black, acetylene black, ketjen black, a carbon fiber, a metal powder or a metal fiber of copper, nickel, aluminum, silver, and the like; a conductive polymer such as a polyphenylene derivative, or mixtures thereof.

In certain embodiments, the positive current collector may include Al, but is not limited thereto.

In certain embodiments, the negative electrode 112 and the positive electrode 114 may be fabricated by a method including mixing each active material, a binder, and a conductive material to provide an active material slurry, and coating the active material slurry on a current collector. In certain embodiments, the solvent includes N-methylpyrrolidone, deionized water, and the like, but is not limited thereto.

In certain embodiments, the electrolyte solution may be the same as described herein.

In certain embodiments, the rechargeable lithium battery may include a separator 113 between the positive electrode 114 and negative electrode 112. In certain embodiments, the separator 113 may be formed of polyethylene, polypropylene, polyvinylidene fluoride or multi-layers thereof such as a polyethylene/polypropylene double-layered separator, a polyethylene/polypropylene/polyethylene triple-layered separator, and a polypropylene/polyethylene/polypropylene triple-layered separator.

Hereinafter, examples of one or more embodiments will be described in detail including comparative examples. However, these examples are not intended to limit the scope of the one or more embodiments.

Example 1

Preparation of Electrolyte solution

Ethylene carbonate (EC), ethyl acetate (EA), and dimethyl carbonate (DMC) were mixed in a volume ratio of 20:10:70, and $LiPF_6$ was added thereto in a concentration of 1.4 M. Then, 1 wt % of 1,3-propane sultone (PS) was added to the mixed solution based on the total amount of the electrolyte solution.

Fabrication of Rechargeable Lithium Battery Cell $LiCoO_2$, polyvinylidene fluoride (PVDF), and denka black were mixed in a weight ratio of 97.75:1.25:1 ($LiCoO_2$:PVDF: denka black) in an N-methylpyrrolidone solvent, preparing a positive active material slurry. The positive active material slurry was uniformly coated on a 20 μm-thick aluminum current collector and dried, fabricating a positive electrode.

A negative active material slurry was prepared by mixing artificial graphite and a styrene-butadiene rubber (SBR) binder in a weight ratio of 98.5:1.5. The negative active material slurry was uniformly coated on a 15 μm-thick copper current collector and dried, fabricating a negative electrode.

A rechargeable lithium battery cell was fabricated by interposing a separator between the positive electrode and the negative electrode.

Example 2

A rechargeable lithium battery cell was fabricated according to the method of Example 1 except for mixing EC:EA: DMC in a volume ratio of 20:20:60.

Example 3

A rechargeable lithium battery cell was fabricated according to the method of Example 1 except for using EC:EA:DMC in a volume ratio of 20:40:40.

Example 4

A rechargeable lithium battery cell was fabricated according to the method of Example 1 except for using EC:EA:DMC in a volume ratio of 20:60:20.

Example 5

A rechargeable lithium battery cell was fabricated according to the method of Example 1 except for using an electrolyte including 3 wt % of PS.

Example 6

A rechargeable lithium battery cell was fabricated according to the method of Example 1 except for mixing EC:EA:DMC in a volume ratio of 20:40:40 and including 3 wt % of PS.

Example 7

A rechargeable lithium battery cell was fabricated according to the method of Example 1 except for mixing EC:EA:DMC in a volume ratio of 20:60:20 and including 3 wt % of PS.

Example 8

Preparation of Electrolyte Solution

An electrolyte solution for a rechargeable lithium battery was prepared according to the method of Example 1 except for mixing EC:EA:DMC in a volume ratio of 20:20:60.

Fabrication of Rechargeable Lithium Battery

A negative active material slurry was prepared by including Si and artificial graphite as a negative active material wherein Si and artificial graphite mixed in a weight ratio of 5:95. Then, a rechargeable lithium battery cell was fabricated according to the method of Example 1 except for using the negative active material slurry and the electrolyte solution in the example.

Example 9

Preparation of Electrolyte Solution

An electrolyte solution for a rechargeable lithium battery was prepared according to the method of Example 1 except for mixing EC:EA:DMC in a weight ratio of 20:60:20.

Fabrication of Rechargeable Lithium Battery Cell

A negative active material slurry was prepared by including Si and artificial graphite as a negative active material wherein mixing Si and artificial graphite in a weight ratio of 3:97. A rechargeable lithium battery cell was fabricated according to the method of Example 1 except for using the negative active material slurry and the electrolyte solution in the example.

Example 10

A rechargeable lithium battery cell was fabricated according to the method of Example 8 except for using an electrolyte including 3 wt % of PS.

Example 11

A rechargeable lithium battery cell was fabricated according to the method of Example 9 except for using an electrolyte solution including 3 wt % of PS.

Example 12

A rechargeable lithium battery cell was fabricated according to the method of Example 2 except for using an electrolyte solution including 5 wt % of PS.

Example 13

A rechargeable lithium battery cell was fabricated according to the method of Example 10 except for using an electrolyte solution including 5 wt % of PS.

Example 14

A rechargeable lithium battery cell was fabricated according to the method of Example 8 except for using an electrolyte solution including 1 wt % of 1,3-propene sultone (PST) instead of PS.

Example 15

A rechargeable lithium battery cell was fabricated according to the method of Example 9 except for using an electrolyte solution including 1 wt % of 1,3-propene sultone (PST) instead of PS.

Example 16

A rechargeable lithium battery cell was fabricated according to the method of Example 14 except for using an electrolyte solution including 3 wt % of 1,3-propene sultone (PST).

Example 17

A rechargeable lithium battery cell was fabricated according to the method of Example 15 except for using an electrolyte solution including 3 wt % of 1,3-propene sultone (PST).

Example 18

A rechargeable lithium battery cell was fabricated according to the method of Example 2 except for using an electrolyte solution including 1 wt % of 1,3-propene sultone (PST) instead of PS.

Example 19

Preparation of Electrolyte Solution

Ethylene carbonate (EC), methyl acetate (MA), and dimethyl carbonate (DMC) were mixed in a volume ratio of 20:10:70, and LiPF6 was added thereto in a concentration of 1.4 M. Then, 1 wt % of propane sultone (PS) was added to the mixed solution based on the total amount of the electrolyte solution.

Fabrication of Rechargeable Lithium Battery Cell

A negative active material slurry was prepared by including Si as well as artificial graphite as a negative active material wherein Si and artificial graphite mixed in a weight ratio of 5:95.

Then, a rechargeable lithium battery cell was fabricated according to the same method as Example 1 except for using the negative active material slurry and the electrolyte solution in the example.

Example 20

A rechargeable lithium battery cell was fabricated according to the same method as Example 19 except for mixing EC:MA:DMC in a volume ratio of 20:60:20 and including 3 wt % of PS.

Example 21

Ethylene carbonate (EC), methyl acetate (MA), and dimethyl carbonate (DMC) were mixed in a volume ratio of 20:10:70, and LiPF6 was added thereto in a concentration of 1.4 M. Then, 1 wt % of propane sultone (PS) was added to the mixed solution based on the total amount of the electrolyte solution.

Fabrication of Rechargeable Lithium Battery Cell

A negative active material slurry was prepared by including Si as well as artificial graphite as a negative active material wherein Si and artificial graphite mixed in a weight ratio of 5:95.

Then, a rechargeable lithium battery cell was fabricated according to the same method as Example 1 except for using the negative active material slurry and the electrolyte solution in the example.

Example 22

A rechargeable lithium battery cell was fabricated according to the same method as Example 21, except for mixing EC:PA:DMC in a volume ratio of 20:60:20 and including 3 wt % of PS.

Comparative Examples 1 to 25

A rechargeable lithium battery cell was fabricated according to the method of Example 1 with the exception of using the amount of components provided in Comparative Examples 1 to 25 of the following Table 1.

TABLE 1

| | Positive active material | Negative active material (weight ratio) | | Li salt (M) | organic solvent (volume %) | | | | | | Sultone (wt %) | |
|---|---|---|---|---|---|---|---|---|---|---|---|---|
| | | artificial graphite | Si | LiPF$_6$ | EC | EMC | DMC | EA | MA | PA | PS | PST |
| Ex. 1 | LiCoO$_2$ | 100 | — | 1.4 | 20 | — | 70 | 10 | | | 1 | — |
| Ex. 2 | LiCoO$_2$ | 100 | — | 1.4 | 20 | — | 60 | 20 | | | 1 | — |
| Ex. 3 | LiCoO$_2$ | 100 | — | 1.4 | 20 | — | 40 | 40 | | | 1 | — |
| Ex. 4 | LiCoO$_2$ | 100 | — | 1.4 | 20 | — | 20 | 60 | | | 1 | — |
| Ex. 5 | LiCoO$_2$ | 100 | — | 1.4 | 20 | — | 70 | 10 | | | 3 | — |
| Ex. 6 | LiCoO$_2$ | 100 | — | 1.4 | 20 | — | 40 | 40 | | | 3 | — |
| Ex. 7 | LiCoO$_2$ | 100 | — | 1.4 | 20 | — | 20 | 60 | | | 3 | — |
| Ex. 8 | LiCoO$_2$ | 95 | 5 | 1.4 | 20 | — | 60 | 20 | | | 1 | — |
| Ex. 9 | LiCoO$_2$ | 97 | 3 | 1.4 | 20 | — | 20 | 60 | | | 1 | — |
| Ex. 10 | LiCoO$_2$ | 95 | 5 | 1.4 | 20 | — | 60 | 20 | | | 3 | — |
| Ex. 11 | LiCoO$_2$ | 97 | 3 | 1.4 | 20 | — | 20 | 60 | | | 3 | — |
| Ex. 12 | LiCoO$_2$ | 100 | — | 1.4 | 20 | — | 60 | 20 | | | 5 | — |
| Ex. 13 | LiCoO$_2$ | 95 | 5 | 1.4 | 20 | — | 60 | 20 | | | 5 | — |
| Ex. 14 | LiCoO$_2$ | 95 | 5 | 1.4 | 20 | — | 60 | 20 | | | — | 1 |
| Ex. 15 | LiCoO$_2$ | 97 | 3 | 1.4 | 20 | — | 60 | 20 | | | — | 1 |
| Ex. 16 | LiCoO$_2$ | 95 | 5 | 1.4 | 20 | — | 60 | 20 | | | — | 3 |
| Ex. 17 | LiCoO$_2$ | 97 | 3 | 1.4 | 20 | — | 60 | 20 | | | — | 3 |
| Ex. 18 | LiCoO$_2$ | 100 | — | 1.4 | 20 | — | 60 | 20 | | | — | 1 |
| Ex. 19 | LiCoO$_2$ | 95 | 5 | 1.4 | 20 | — | 70 | | 10 | | 1 | |
| Ex. 20 | LiCoO$_2$ | 95 | 5 | 1.4 | 20 | — | 20 | | 60 | | 3 | |
| Ex. 21 | LiCoO$_2$ | 95 | 5 | 1.4 | 20 | — | 70 | | | 10 | 1 | |
| Ex. 22 | LiCoO$_2$ | 95 | 5 | 1.4 | 20 | — | 20 | | | 60 | 3 | |
| Comp. Ex. 1 | LiCoO$_2$ | 100 | — | 1.4 | 20 | 20 | 60 | — | — | | 1 | |
| Comp. Ex. 2 | LiCoO$_2$ | 100 | — | 1.4 | 20 | 40 | 40 | — | — | | 1 | |
| Comp. Ex. 3 | LiCoO$_2$ | 89 | 11 | 1.4 | 20 | 20 | 60 | — | — | | 1 | |
| Comp. Ex. 4 | LiCoO$_2$ | 100 | — | 1.4 | 20 | | 80 | 0 | — | | 0 | |
| Comp. Ex. 5 | LiCoO$_2$ | 100 | — | 1.4 | 20 | | 70 | 10 | — | | 0 | |
| Comp. Ex. 6 | LiCoO$_2$ | 100 | — | 1.4 | 20 | | 40 | 40 | — | | 0 | |
| Comp. Ex. 7 | LiCoO$_2$ | 100 | — | 1.4 | 20 | | 20 | 60 | — | | 0 | |
| Comp. Ex. 8 | LiCoO$_2$ | 100 | — | 1.4 | 20 | | 0 | 80 | — | | 0 | |

TABLE 1-continued

| | Positive active material | Negative active material (weight ratio) artificial graphite | Si | Li salt (M) LiPF$_6$ | organic solvent (volume %) EC | EMC | DMC | EA | MA | PA | Sultone (wt %) PS | PST |
|---|---|---|---|---|---|---|---|---|---|---|---|---|
| Comp. Ex. 9 | LiCoO$_2$ | 89 | 11 | 1.4 | 20 | | 80 | 0 | — | | 0 | |
| Comp. Ex. 10 | LiCoO$_2$ | 89 | 11 | 1.4 | 20 | | 60 | 20 | — | | 0 | |
| Comp. Ex. 11 | LiCoO$_2$ | 89 | 11 | 1.4 | 20 | | 20 | 60 | — | | 0 | |
| Comp. Ex. 12 | LiCoO$_2$ | 89 | 11 | 1.4 | 20 | | 0 | 80 | — | | 0 | |
| Comp. Ex. 13 | LiCoO$_2$ | 100 | — | 1.4 | 20 | | 70 | 10 | — | | 6 | |
| Comp. Ex. 14 | LiCoO$_2$ | 100 | — | 1.4 | 20 | | 40 | 40 | — | | 6 | |
| Comp. Ex. 15 | LiCoO$_2$ | 100 | — | 1.4 | 20 | | 20 | 60 | — | | 6 | |
| Comp. Ex. 16 | LiCoO$_2$ | 89 | 11 | 1.4 | 20 | | 60 | 20 | — | | 6 | |
| Comp. Ex. 17 | LiCoO$_2$ | 89 | 11 | 1.4 | 20 | | 20 | 60 | — | | 6 | |
| Comp. Ex. 18 | LiCoO$_2$ | 89 | 11 | 1.4 | 20 | | 20 | 60 | — | | — | 6 |
| Comp. Ex. 19 | LiCoO$_2$ | 89 | 11 | 1.4 | 20 | | 40 | 40 | — | | — | 6 |
| Comp. Ex. 20 | LiCoO$_2$ | 89 | 11 | 1.4 | 20 | | 60 | 20 | — | | — | 6 |
| Comp. Ex. 21 | LiCoO$_2$ | 95 | 5 | 1.4 | 20 | 60 | 20 | — | — | | 1 | |
| Comp. Ex. 22 | LiCoO$_2$ | 100 | — | 1.4 | 20 | 60 | 20 | — | — | | 1 | |
| Comp. Ex. 23 | LiCoO$_2$ | 95 | 5 | | 20 | 20 | 60 | — | — | | 1 | |
| Comp. Ex. 24 | LiCoO$_2$ | 95 | 5 | 1.4 | 20 | | 60 | 20 | — | | — | 6 |
| Comp. Ex. 25 | LiCoO$_2$ | 95 | 5 | 1.4 | 20 | | 20 | 60 | — | | — | 6 |

ANALYSIS SECTION

Experimental Example 1

Cycle Characteristic Evaluation of Rechargeable Lithium Battery Cells at a Low Temperature of 10° C.

The rechargeable lithium battery cells according to Example 1 to 18 and Comparative Examples 1 to 25 were tested to evaluate life-cycle characteristics at a low temperature in the following method.

Specifically, low temperature capacities of the rechargeable lithium battery cells according to Examples and Comparative Examples was measured by charging them under a CC-CV condition of 0.5 C and 4.35V of a charge voltage, being allowed to stand at 10° C. for 2 hours, and discharging them at 0.5 C down to 3 V.

In addition, life-cycle characteristics of the rechargeable lithium battery cells according to Examples and Comparative Examples were evaluated by charging them under a CC-CV condition of 0.5 C and 4.35V of a charge voltage at a room temperature for 2 hours and discharging them at a cut-off of 1.0 C and 3.0V in one cycle and repeating 50 cycles.

Then, low temperature life-cycle characteristics of the rechargeable lithium battery cells were evaluated as capacity retention (%) measured at a room temperature of 25° C., and the capacity retention (%) at low temperature was calculated according to the following equation 1.

$$\text{capacity retention}(\%) = 50 \text{ cycle discharge capacity}/\text{initial discharge capacity} \times 100 \text{ (Initial discharge capacity: 2950 mAh)} \quad \text{Equation (1)}$$

Experimental Example 2

Cycle Characteristic Evaluation of Rechargeable Lithium Battery Cells at a High Temperature of 45° C.

The rechargeable lithium battery cells according to Examples 1 to 18 and Comparative Examples 1 to 25 were experimented in the following method to evaluate high temperature life-cycle characteristics.

Specifically, high temperature capacities of the rechargeable lithium battery cells according to Examples and Comparative Examples was measured by charging them under a CC-CV condition of 0.8 C and 4.2V or 4.35V of a charge voltage, allowed to stand at 45° C. for 2 hours, and discharging them down to 3V with 0.5 C.

In addition, life-cycle characteristics of the rechargeable lithium battery cells were evaluated by charging them at a room temperature under a CC-CV condition of 0.5 C and 4.2 or 4.35V of a charge voltage for 2 hours and discharging them under a cut-off of 1.0 C and 3.0V in one cycle and repeating 130 cycles.

The high temperature life-cycle characteristics were evaluated as capacity retention (%) measured at 45° C., and the capacity retention (%) at high temperature was calculated according to the following equation 2.

$$\text{capacity retention}(\%) = 130 \text{ cycle discharge capacity}/\text{initial discharge capacity} \times 100 \text{ (initial discharge capacity: 2950 mAh)} \quad \text{Equation (2)}$$

The results of Experimental Examples 1 and 2 are provided in the following Table 2.

TABLE 2

|  | 10° C. (50$^{th}$ cycle) | | 45° C. (130$^{th}$ cycle) | |
| --- | --- | --- | --- | --- |
|  | Discharge capacity (mAh) | Capacity retention (%) | Discharge capacity (mAh) | Capacity retention (%) |
| Example 1 | 2526 | 86 | 2057 | 70 |
| Example 2 | 2605 | 88 | 2155 | 73 |
| Example 3 | 2516 | 85 | 2134 | 72 |
| Example 4 | 2414 | 82 | 2018 | 68 |
| Example 5 | 2246 | 76 | 1947 | 66 |
| Example 6 | 2482 | 84 | 1955 | 66 |
| Example 7 | 2310 | 78 | 1918 | 65 |
| Example 8 | 2713 | 92 | 2760 | 94 |
| Example 9 | 2709 | 92 | 2450 | 83 |
| Example 10 | 2714 | 92 | 2684 | 91 |
| Example 11 | 2720 | 92 | 2387 | 81 |
| Example 12 | 2426 | 82 | 2102 | 71 |
| Example 13 | 2433 | 82 | 2548 | 86 |
| Example 14 | 2487 | 84 | 2679 | 91 |
| Example 15 | 2411 | 82 | 2703 | 92 |
| Example 16 | 2439 | 83 | 2666 | 90 |
| Example 17 | 2410 | 82 | 2659 | 90 |
| Example 18 | 2452 | 83 | 2135 | 72 |
| Example 19 | 2087 | 71 | 1904 | 65 |
| Example 20 | 2146 | 73 | 2051 | 70 |
| Example 21 | 2200 | 75 | 1846 | 63 |
| Example 22 | 2209 | 75 | 1875 | 64 |
| Comparative Example 1 | 1521 | 3 | 108 | 4 |
| Comparative Example 2 | 1431 | 52 | 52 | 2 |
| Comparative Example 3 | 947 | 49 | 434 | 15 |
| Comparative Example 4 | 717 | 32 | 18 | 1 |
| Comparative Example 5 | 1858 | 24 | 1368 | 46 |
| Comparative Example 6 | 1949 | 63 | 1425 | 48 |
| Comparative Example 7 | 1181 | 66 | 1401 | 47 |
| Comparative Example 8 | 746 | 40 | 448 | 15 |
| Comparative Example 9 | 82 | 3 | 156 | 5 |
| Comparative Example 10 | 1218 | 41 | 1662 | 56 |
| Comparative Example 11 | 1647 | 56 | 1630 | 55 |
| Comparative Example 12 | 827 | 28 | 1452 | 49 |
| Comparative Example 13 | 1170 | 40 | 1447 | 49 |
| Comparative Example 14 | 825 | 28 | 1322 | 45 |
| Comparative Example 15 | 1397 | 47 | 1085 | 37 |
| Comparative Example 16 | 1107 | 38 | 1578 | 53 |
| Comparative Example 17 | 998 | 34 | 1684 | 57 |
| Comparative Example 18 | 1184 | 40 | 1029 | 35 |
| Comparative Example 19 | 1220 | 41 | 1097 | 37 |
| Comparative Example 20 | 1242 | 42 | 1052 | 36 |
| Comparative Example 21 | 284 | 10 | 312 | 11 |
| Comparative Example 22 | 307 | 10 | 208 | 7 |
| Comparative Example 23 | 405 | 14 | 164 | 6 |
| Comparative Example 24 | 395 | 13 | 981 | 33 |
| Comparative Example 25 | 343 | 12 | 1804 | 61 |

In the preceding Experimental Examples, Comparative Examples 1 and 2 use an electrolyte solution composition including EC, EMC, and DMC, and Examples 2 and 3 were prepared under the same condition as Comparative Examples 1 and 2 except for using EA instead of EMC. As shown in Table 2, the cells according to Comparative Examples 1 and 2 had remarkably low discharge capacity and capacity retention at a low high temperature and a high temperature compared with the cells according to Examples 2 and 3. In addition, Examples 19 and 20 under the same condition as Comparative Example 1 except for using methyl acetate (MA) instead of ethyl acetate (EA), and Examples 21 and 22 under the same conditions as Comparative Example 1, except for using propyl acetate (PA) instead of ethyl acetate (EA), also improved life-cycle characteristics of a rechargeable lithium battery at low and high temperatures. Accordingly, an electrolyte solution including alkyl acetate, such as EA, MA, PA, instead of EMC was identified to improve life-cycle characteristics of a rechargeable lithium battery at low and high temperatures.

Examples 8 to 11 and Examples 13 to 17 using a negative active material including artificial graphite and Si had improved high temperature life-cycle characteristics compared with Examples 1 to 7 using a negative active material including only artificial graphite.

For example, Example 18 using an electrolyte solution including 1 wt % of PST and EC:EA:DMC in a volume ratio of 2:2:6 and a negative active material including only artificial graphite had a capacity retention of 72% at a high temperature, while Example 14 using the same electrolyte solution and a negative active material including both artificial graphite and Si had a capacity retention of 91% at a high temperature. Thus, an electrolyte solution with the preceding composition sharply improved high temperature life-cycle characteristics despite using a negative active material including Si.

Figure 2:
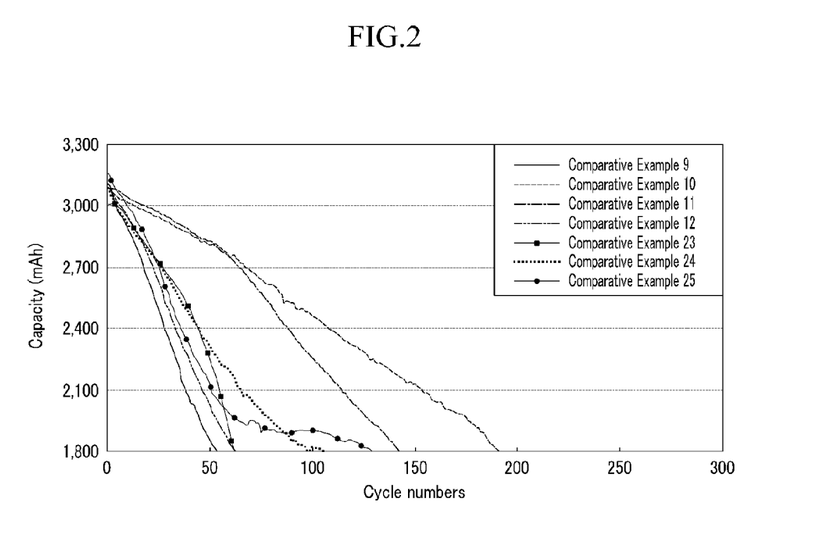
FIG. 2 is a graph showing life-cycle characteristics of the rechargeable lithium battery cells according to Comparative Examples 9 to 12 and Comparative Examples 23 to 25 at a high temperature of 45° C.
Figure 3:
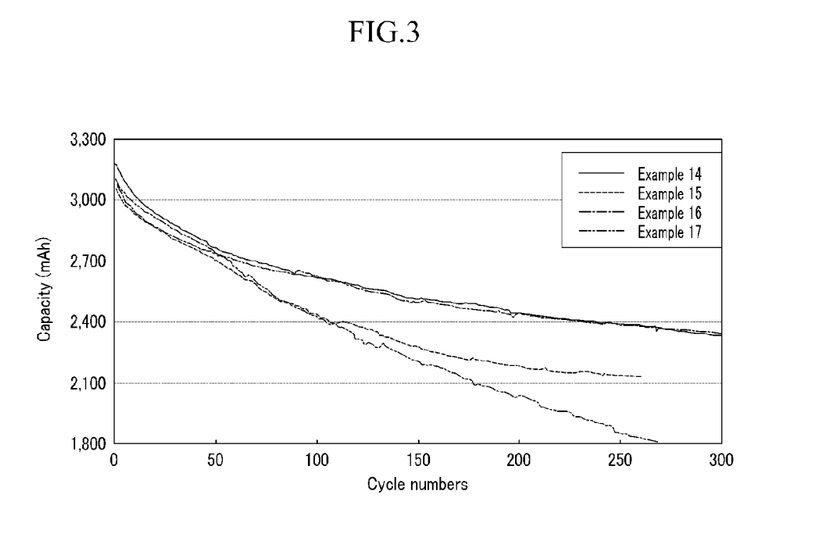
FIG. 3 is a graph showing high temperature (45° C.) life-cycle characteristics of the rechargeable lithium battery cells according to Examples 14 and 16.

Comparative Examples 21 and 22 tested at a high temperature under the same condition as Examples 14 and 18, with the exception of using EMC instead of EA, show capacity retention (%) of respectively 11% and 7%. The results indicates that the degree of improvement on high temperature life-cycle characteristics of a cell using a negative active material including Si is greater when the electrolyte includes EA. A negative active material including PS or PST as well as Si improved high temperature life-cycle characteristics when used with an electrolyte solution including EA. FIGS. 2 and 3 show high temperature life-cycle characteristics at 45° C. of a rechargeable lithium battery including both artificial graphite and Si as a negative active material.

As shown in FIG. 3, Examples 14 and 16 respectively including 1 wt % and 3 wt % of PST had excellent high temperature life-cycle characteristics.

In contrast, Comparative Examples 9 to 12, 24, and 25 which used an electrolyte solution including EA same as Examples 14 and 16, but no PST or PST in an amount of more than 5 wt %, such as 6 wt %, showed unfavorable high temperature life-cycle characteristics. In addition, Comparative Example 23 which used an electrolyte including 1 wt % of PST but EMC instead of EA had unfavorable high temperature life-cycle characteristics (FIG. 2). In certain embodiments, a rechargeable lithium battery including a Si-based compound as a negative active material had improved high temperature life-cycle characteristics when an electrolyte solution including EA and PST in an amount ranging from 0.1 to 5 wt % were used together.

While the present embodiments have been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:
1. An electrolyte for a rechargeable lithium battery, consisting of:
   an additive component, wherein the additive component is 1,3-propane sultone or 1,3-propene sultone;
   a lithium salt;

a first organic solvent component, wherein the first organic solvent is methyl acetate, ethyl acetate or propyl acetate; and a second organic solvent component, wherein the second organic solvent is a mixture of dimethyl carbonate (DMC) and ethylene carbonate (EC), wherein the electrolyte includes from 0.1% to 5% by weight of the additive component based on the total weight of the electrolyte.

2. The electrolyte for a rechargeable lithium battery of claim 1, wherein the electrolyte includes from 10% to 60% by volume of the first organic solvent component based on the total volume of the electrolyte.

3. The electrolyte for a rechargeable lithium battery of claim 1, wherein the additive component is 1,3-propane sultone.

4. The electrolyte for a rechargeable lithium battery of claim 1, wherein the lithium salt is $LiPF_6$, $LiBF_4$, $LiSbF_6$, $LiAsF_6$, $LiN(SO_2C_2F_5)_2$, $LiN(SO_2CF_3)_2$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ wherein x and y are natural numbers, LiCl, LiI, or $LiB(C_2O_4)_2$ (lithium bis(oxalato) borate), or one or more combinations thereof.

5. The electrolyte for a rechargeable lithium battery of claim 1,
wherein:
the additive component is 1,3-propene sultone; and
the lithium salt is $LiPF_6$.

6. The electrolyte for a rechargeable lithium battery of claim 2, wherein the volume ratio of first organic solvent component to second organic solvent component is in a range of from about 1:50 to about 50:1, from about 1:10 to about 10:1, or from about 1:9 to about 3:2.

7. A rechargeable lithium battery comprising:
a negative electrode including a negative active material;
a positive electrode including a positive active material; and,
the electrolyte of claim 1.

8. The rechargeable lithium battery of claim 7, further comprising a separator interposed between the negative electrode and the positive electrode.

9. The rechargeable lithium battery of claim 7, wherein the negative active material includes one or more components selected from the group consisting of a carbon material, a Si-based compound, a Sn-based compound, a lithium metal, a lithium metal alloy, and a transition metal oxide.

10. The rechargeable lithium battery of claim 7, wherein the negative active material includes a carbon material, wherein the carbon material is graphite.

11. The rechargeable lithium battery of claim 10, wherein the negative active material further comprises a Si-based compound, wherein the Si-based compound is selected from the group consisting of Si, $SiO_x$, a Si-carbon composite, a Si-Q alloy, and combinations thereof,
wherein,
($0<x<2$), and Q is selected from the group consisting of an alkali metal, an alkaline-earth metal, elements selected from Group 13 to 16, a transition element, a rare earth element, and a combination thereof, where Q is not Si.

12. The rechargeable lithium battery of claim 11, wherein the ratio of the weight of the Si-based compound to the weight of graphite ranges from about 1:99 to 10:90.

13. The rechargeable lithium battery of claim 12, wherein the ratio of the weight of the Si-based compound to the weight of the graphite ranges from about 2:98 to about 6:94.

14. The rechargeable lithium battery of claim 7, wherein the additive component is 1,3-propane sultone; and the first organic solvent component is methyl acetate or ethyl acetate.

15. The rechargeable lithium battery of claim 14,
wherein:
the lithium salt is $LiPF_6$;
the first organic solvent component is ethyl acetate; and
the negative active material includes a Si-based compound and graphite.

* * * * *